United States Patent [19]

Baumrucker

[11] Patent Number: 4,479,914
[45] Date of Patent: Oct. 30, 1984

[54] PROCESS AND MOLD FOR MOLDING FOAMED PLASTIC ARTICLES

[75] Inventor: Ervin J. Baumrucker, Highlands, N.C.

[73] Assignee: Cashiers Plastics, Portland, Oreg.

[21] Appl. No.: 438,377

[22] Filed: Nov. 1, 1982

[51] Int. Cl.³ .......................................... B29D 27/00
[52] U.S. Cl. ................... 264/45.5; 264/40.3; 264/51; 264/101; 264/334; 264/DIG. 83; 425/159; 425/444; 425/546; 425/812; 425/817 R
[58] Field of Search ............... 264/51, 53, 54, 45.5, 264/DIG. 83, 201, 334, 40.3; 425/812, 817 R, 425/546, 159, 444

[56] References Cited

U.S. PATENT DOCUMENTS

| | | | |
|---|---|---|---|
| 3,268,635 | 8/1966 | Kraus et al. | 264/41 |
| 3,436,446 | 4/1969 | Angell, Jr. | 264/51 |
| 3,773,873 | 11/1973 | Spaak et al. | 264/37 |
| 3,960,996 | 6/1976 | Balevski | 264/37 |
| 4,031,176 | 6/1977 | Molbert | 264/45.2 |
| 4,092,385 | 5/1978 | Balevski | 264/45.5 |
| 4,096,218 | 6/1978 | Yasuike et al. | 264/45.5 |
| 4,129,635 | 12/1978 | Yasuike et al. | 264/45.5 |
| 4,153,231 | 5/1979 | Hayakawa et al. | 249/82 |
| 4,208,368 | 6/1980 | Egli | 264/45.5 |
| 4,229,395 | 10/1980 | Nagumo et al. | 264/51 |
| 4,255,368 | 3/1981 | Olabisi | 264/45.5 |
| 4,296,055 | 10/1981 | Harris | 264/45.5 |

OTHER PUBLICATIONS

The brochure Cashiers' Pressure Process, A Revolutionary Development in Smooth Structural Foam.
The article "From Design Concept to Finish Product".
The article "The State of the Art in Processing Thermoplastics Containing Blowing Agents, with Special Consideration of the Gas Counterpressure Process & Coinjection Molding Process", Eckardt, Helmut & Alex, Kurt, Battenfeld, 11/1979.
Whittington's Dictionary of Plastics, by Lloyd R. Whittington, Stamford, Conn., Technomic, ©1968, Preface, pp. 59 and 60.

Primary Examiner—Philip Anderson
Attorney, Agent, or Firm—Klarquist, Sparkman, Campbell, Leigh & Whinston

[57] ABSTRACT

A method for forming foamed plastic articles which includes the steps of closing a mold; prepressurizing the mold cavity with gas to prevent premature diffusion of blowing gas from the material injected into the cavity; injecting a short shot of molten synthetic resin material containing a blowing agent into the cavity; venting a portion of the prepressurization gas during the injection step; and venting the remaining prepressurization gas from the mold cavity to a vacuum chamber means to allow expansion of the injected foamable resin material within the mold cavity, the vacuum drawing the resin material throughout the mold cavity. In addition, the vacuum chamber is coupled to the mold cavity through plural spaced passageways so that the vacuum is drawn at various locations throughout the cavity to thereby enhance the complete filling of the cavity with the injected material as it expands. The mold is vented following the injection step automatically at the expiration of a predetermined time following the closing of a nozzle of the injection apparatus. A mold for carrying out the process includes improved gas flow means for delivering gas to and venting gas from the mold cavity. The mold also includes improved sealing means for sealing the mold to maintain it in a pressurized state as desired.

9 Claims, 6 Drawing Figures

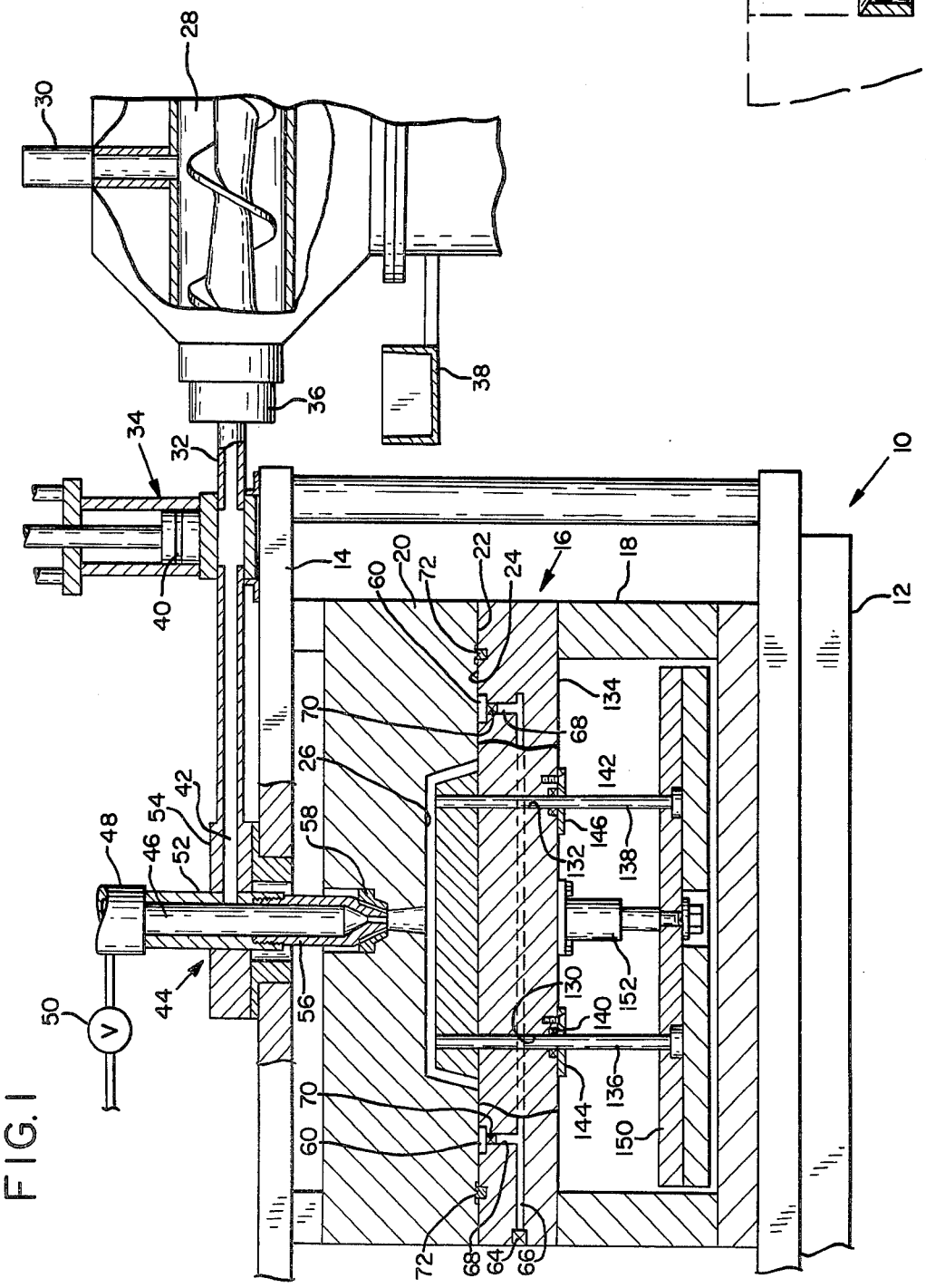
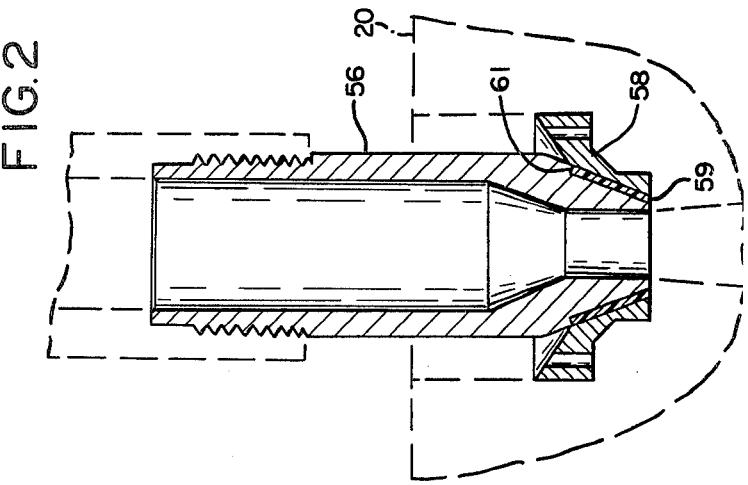

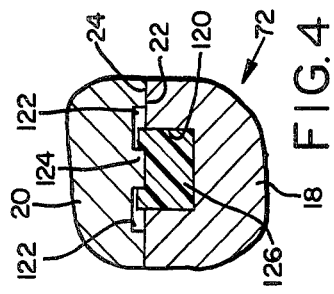
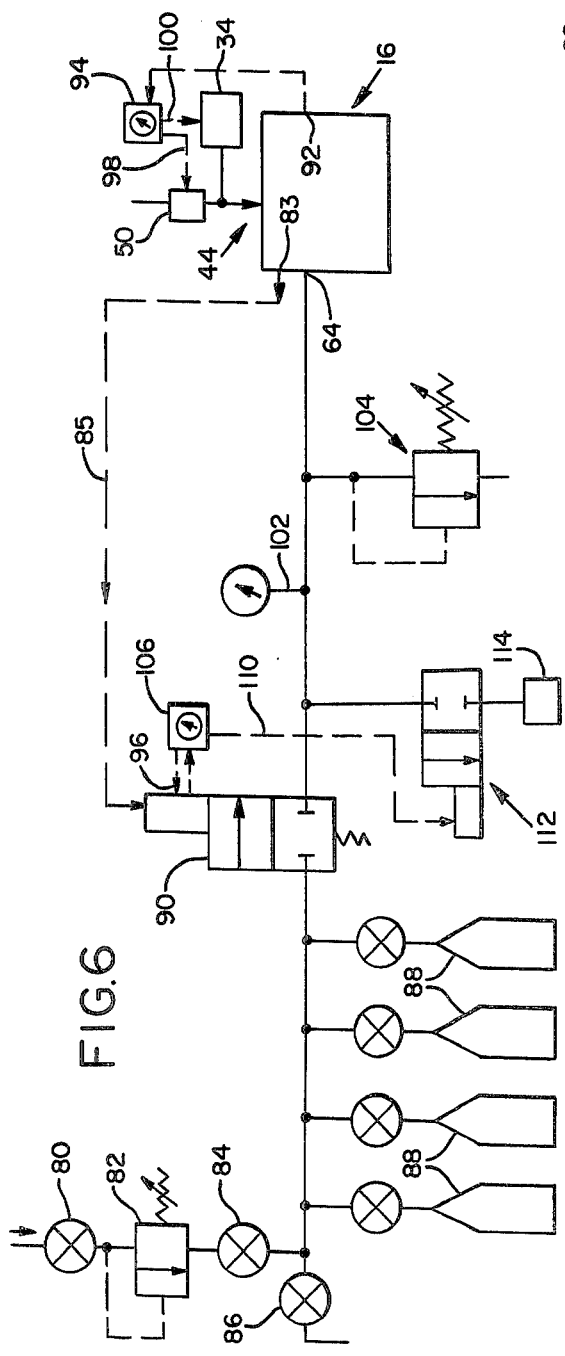
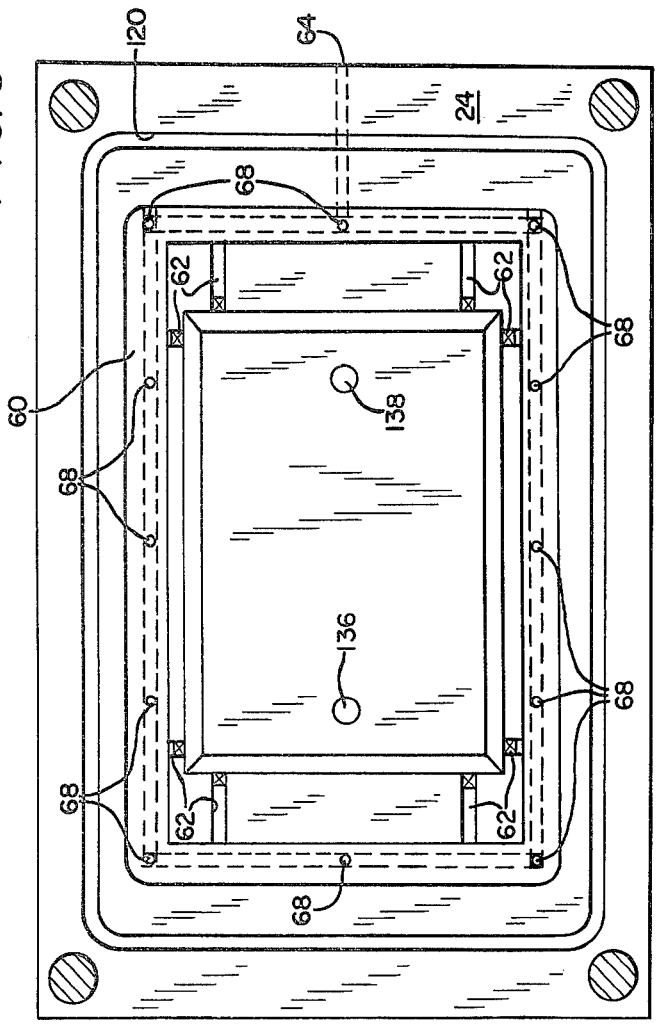
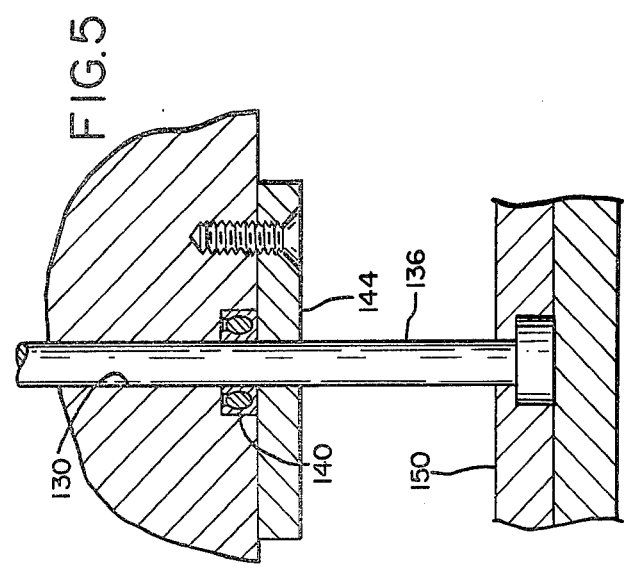

PROCESS AND MOLD FOR MOLDING FOAMED PLASTIC ARTICLES

BACKGROUND OF THE INVENTION

This invention relates to a method and mold for molding foamed or expanded plastic articles.

Injection molding of foamed plastic articles is becoming more economical and commercially practicable as labor and other manufacturing costs of other molding methods continue to rise. Foamed articles are lightweight, have improved strength, rigidity, and other advantageous physical properties. These articles are used in many applications, such as for appliance housings, and are generally in the form of a rigid foam plastic cellular core covered by a non-porous and non-foamed skin of the same composition.

Prior art foamed plastic articles are characterized by a poor quality skin; that is, a skin exhibiting swirls, mottled or untrue color definition, as well as surface defects such as sink marks, pin holes, cracks, and fissures. These defects are produced during injection. For example, gas released from the foamed plastic shot penetrates the skin as the cavity is being filled, resulting in the formation of swirl and surface defects. Such defects are typically repaired by relatively time-consuming and costly finishing operations.

In one known attempt to overcome these problems, molds are pre-heated to allow the injected plastic material to continue to flow into the mold and complete its expansion prior to the solidification of the skin. Because of the increased temperature of the mold, the mold cycle time is substantially increased. As a result, production rates are lowered and manufacturing costs raised.

In another known technique, molds are coated with a polymer material, such as with TEFLON coating material. This coating is intended to facilitate slippage of the plastic as it is injected, so as to minimize swirls. However, results have been unsatisfactory.

In other prior approaches, a high injection speed is used to fill the mold more rapidly. In theory, with a high enough injection speed, the mold is filled before substantial foaming takes place, so that slippage and corresponding swirl is reduced. However, in practice, articles produced in this manner still are characterized by a surface swirl pattern.

A co-injection technique is another known approach. In this technique, two resins are injected, one resin forming the skin of the article, and the other forming the core. A blowing agent (gas) is added to only the core resin so that it expands to form a cellular interior structure. The skin is formed from an unfoamed resin. Although this approach results in articles having desirable surface characteristics, relatively expensive machinery is required, and there tends to be a limit on the size of parts which may be molded.

In a still further prior technique, an expanding mold is used. In this approach, a mold is prepressurized, and a full shot, a charge that fills the entire mold, of foamable material is injected into the mold. After the skin forms, the mold is vented and expanded to permit foaming of the injected material. Although this approach does eliminate some of the surface defects in molded articles, expanding molds are typically more expensive, and not all parts are easy to form in an expanding mold.

In a prior gas counter-pressure technique, a mold is pressurized and then completely filled with molten plastic. Foaming in the mold occurs in compensation for volume contractions which take place as the plastic cools. However, with this approach, it can be difficult to match the contraction and the expansion so that the entire mold is full when the article is finished.

In an additional prior process, as exemplified by U.S. Pat. No. 4,229,395 of Nagumo, et al, a molding process is disclosed which includes the steps of prepressurizing a mold, injecting a short shot (a charge that does not entirely fill the mold) of foamable material, releasing pressure from the mold to allow the material to foam, and cooling the mold, at least during the injection step. However, several deficiencies are exhibited by such a method. For example, in a mold having a complicated angular shape, it can be difficult for the material to fill the mold completely.

Therefore, a need exists for a method and a mold for forming foamable plastic articles directed toward solving these and other problems.

SUMMARY OF THE INVENTION

This invention is a method and mold for the injection molding of foamable plastic articles that may be practiced in conventional injection molding machines. Cycle time for molding articles according to the method are almost identical to those of conventional structural foam molding cycles. Molds, which form a part of the invention, are mechanically simple, yet are relatively inexpensive to produce. Articles produced by this invention are characterized by smooth, evenly colored surfaces over a substantial portion of the article.

More specifically, the method involves the steps of closing a mold; prepressurizing the mold cavity with gas to prevent premature diffusion of blowing gas from the material injected into the cavity; injecting a short shot of molten synthetic resin material containing a blowing agent into the cavity; venting a portion of the prepressurization gas during the injection step; and venting the remaining prepressurization gas from the mold cavity to a vacuum chamber means to allow expansion of the injected foamable resin material within the mold cavity, the vacuum drawing the resin material throughout the mold cavity. In addition, the vacuum chamber is coupled to the mold cavity through plural spaced passageways so that the vacuum is drawn at various locations throughout the cavity to thereby enhance the complete filling of the cavity with the injected material as it expands. The mold is vented following the injection step automatically at the expiration of a predetermined time following the closing of the nozzle or nozzles. A mold for carrying out the process includes improved gas flow means for delivering gas to and venting gas from the mold cavity. The mold also includes improved sealing means for sealing the mold to maintain it in a pressurized state as desired.

It is a primary object of the invention to provide a method and mold for forming foamable plastic articles by injecting molding techniques wherein the articles have a smooth skin of uniform color and in which undesirable swirl has been substantially eliminated.

It is still another object of the invention to provide a method and mold for forming foamed articles which exhibit high strength and rigidity, have a smooth skin, and have a core with a fine cell structure due to the uniform and substantially instantaneous venting of prepressurization gas from the mold to prevent premature foaming of the material within the mold.

Another object of the invention is to provide a method suitable for forming a wide variety of articles, including large articles and angular articles.

Still another object of the invention is to provide a mold which can be utilized on most low and high speed single and multi-nozzle molding machines.

A still further object of the invention is to provide a method having advantageous cycle times for producing molded articles.

A further object of the invention is to provide an economic method and mold for producing articles, with the cost savings primarily due to the minimization of finishing steps otherwise needed to complete the articles.

A further object of the invention is to provide a mold with improved gas delivery and venting capabilities and improved seals.

These and other objects, advantages, and features of the invention will become apparent with reference to the following description and drawings.

BRIEF DESCRIPTION OF THE DRAWINGS

FIG. 1 is a side elevational view, partially in sections, showing a preferred embodiment of a mold and apparatus for carrying out the method of the present invention;

FIG. 2 is an enlarged sectional view of the injection nozzle utilized in the system of FIG. 1;

FIG. 3 is a top plan view of the fixed portion of the mold of FIG. 1;

FIG. 4 is an enlarged view of an improved seal for sealing the mold of FIG. 3;

FIG. 5 is an enlarged view of a portion of a sealed ejector pin in accordance with the invention; and FIG. 6 is a schematic diagram of a gas delivery and venting system used in the apparatus of FIG. 1.

DETAILED DESCRIPTION OF THE PREFERRED EMBODIMENT

Referring to FIG. 1, the apparatus for carrying out the process includes a press 10, having plattens 12, 14, which support a mold 16 therebetween. An exemplary mold includes a stationary mold portion 18 and a fixed mold portion 20. Adjacent surfaces 22, 24, of the mold portions have side margins which abut one another when the mold is closed, as shown. The central portions of surfaces 22, 24 define a mold cavity 26 therebetween.

A plastic material-gas mixture is manufactured and delivered to the mold cavity 26 as follows. Solid plastic particles or pellets are fed to a hopper (not shown) of a conventional extruder 28 for the plasticating of plastic material. Gas, such as nitrogen, is injected into the extruder through an inlet 30 so that a molten plastic material-gas mixture is formed. This material-gas mixture is passed under pressure through a conduit 32 to a conventional accumulator 34. A safety relief valve 36 is provided at the outlet of the extruder. Excess plastic-gas mixture falls from valve 36 into a purge tray 38 as required to relieve pressure within the conduit 32.

Accumulator 34 has a movable piston member 40 which is forced upward by the molten plastic-gas material as it flows into the accumulator wherein it is stored until discharged by piston 40 from the chamber and through a manifold passage 42 to a nozzle assembly 44.

Nozzle assembly 44 includes a movable rod 46 operated by a pneumatic actuator 48 under the control of a valve 50. Rod 46 is raised and lowered within a nozzle assembly housing 52 which surrounds the rod and is mounted to a manifold 54. A tapered nozzle 56 is secured to the lower end of housing 52 and is sealed against a seat 58 of mold portion 20. An annular insert 59 (FIG. 2) of a plastic material, such as the material sold under the trademark RULON, acts as a seal between the nozzle tip and seat. The nozzle tip is of reduced diameter and provided with a shoulder 61 which abuts the free end of the insert to enhance the seal.

In general, with the rod 46 in a position which closes the manifold passageway 42, the accumulator piston 40 is raised by a shot of molten material as it enters the accumulator. Thereafter, the rod 46 is raised to open a path from manifold passageway 42 through the nozzle 56 to the mold cavity. The piston 40 then forces the shot of material from the accumulator into manifold passageway 42 and hence into the mold cavity.

A gas flow means is incorporated into the mold for delivering a prepressurization gas to and venting such gas from the mold cavity. Such gas flow means includes an annular groove 60 (FIG. 3) formed in the side margins of the surface 24. Groove 60 surrounds the central portion of this surface, and hence the mold cavity. Plural gas flow channels 62 (FIG. 3) are formed in the side margins of the surface 24 and communicate between the mold cavity 26 and the annular groove 60 when the mold is closed. These gas flow channels 62 communicate with locations of the mold cavity, such as corners, which are more difficult to fill with molten material during molding. Consequently, when a vacuum is applied to such passageways, as explained below, material is drawn into such hard to fill locations. The movable mold portion 18 is provided with a single external gas supply and gas venting opening 64. The movable mold portion also defines an internal gas passageway which communicates with the groove 60 at a plurality of locations. More specifically, with the mold illustrated in FIG. 1, the internal gas passageway comprises a passageway 66 extending in a horizontal plane underneath the mold cavity 26 and vertical riser passageways 68 which couple the main passageway 66 to the groove 60 at plural locations. Screens 70 are provided to prevent material from falling into and plugging the passageways 68. With the above passageway system, a change in pressure at opening 64 is substantially instantaneously communicated to various spaced locations of the mold cavity.

An annular seal 72 is provided for sealing the space between the first and second surfaces 22, 24 at a location which is peripheral of the groove 60. With reference to FIG. 4, the seal 72 comprises a sealing trough 120 formed in the surface 24 of the movable mold portion 18. This trough surrounds the annular groove 60. A pair of annular sealing channels 122 are formed in the surface 22 of the fixed mold portion 20. The channels 122 are separated by a rib 124 which overlies the trough 120. A resilient seal 126 is positioned within the trough and sized to project above the surface 22 of mold portion 18. Consequently, the rib 124 bears against and compresses the seal when the mold is closed to thereby seal the space between the first and second surfaces. Of course, the sealing trough can be positioned in the movable mold portion, with the sealing channels 122 positioned in the fixed mold portion in an equivalent construction.

The apparatus is provided with ejector pins for ejecting molded articles from the mold. These ejector pins will be described with reference to FIGS. 1 and 5. More specifically, the movable mold portion 18 defines plural transverse ejector pin receiving bores 130, 132. These bores communicate between the mold cavity defining central portion of the surface 24, and another surface 134 (FIG. 1) of the fixed mold portion. The surface 134 is spaced from the surface 24 and bounds one side of an interior hollow region of the movable mold portion 18. A pair of ejector pins 136, 138 are slidably received within the respective bores 130, 132. Annular seals 140, 142, recessed into the surface 134, surround the ejector pins 136, 138. These seals are held in place by seal retainer caps 144, 146, mounted by fasteners to the surface 134. These caps 144, 146 each include an ejector pin opening which registers with the associated ejector pin bore so as to permit sliding of the ejector pins through the caps and within the bores. A movable plate 150 supports the ejector pins. This plate is moved by a hydraulic cylinder 152 to correspondingly move the ejector pins from positions shown in FIG. 1, in which the pins are flush with the surface of the mold cavity, to second positions in which the pins project into the mold cavity to eject the molded article.

A gas delivery and venting system is shown in FIG. 6 and will be described in conjunction with a description of the operation of the apparatus. This system is designed to prepressurize the mold prior to the injection of material into the mold. The pressure is maintained at a level which substantially prevents the diffusion of the blowing gas produced from the foaming agent. As a result, as a shot of material is injected into the mold cavity, foaming is prevented. During injection, a portion of the prepressurization gas is vented to maintain constant mold pressure. Following the injection step, the remaining prepressurization gas is vented from the mold cavity to permit foaming of the material within the cavity. A short shot of material is injected into the cavity, so that prior to foaming the mold cavity is only partially filled. Upon venting of the prepressurization gas from the cavity, a space is therefore provided within the mold for expansion of the plastic-gas mixture. In addition, the prepressurization gas is vented to a vacuum to draw the molten resin material throughout the mold cavity.

More specifically, a gas, such as nitrogen, which does not react with the molten plastic material is vaporized from a liquid nitrogen storage tank (not shown), compressed to a desired pressure, for example 1000 psig, and delivered to a gate valve 80. An adjustable pressure regulator 82 establishes the pressure of gas delivered to the mold, typically within the range of 200 to 650 psig. The pressure depends upon the molten material and blowing agent being utilized and is set at a level to prevent premature foaming of the plastic. A normally open gate valve 84 is provided for shutting off the gas supply, as desired, without affecting the regulator setting. Another gate valve 86 is provided to bleed gas from the system if required. Plural gas storage cylinders 88 store the gas for use in the system.

The mold is prepressurized as follows. A solenoidoperated, normally closed valve 90 blocks the flow of gas to the mold, except when desired to prepressurize the mold. When the mold is closed, contacts 83 on the mold are closed, causing a control signal to be fed on line 84 to valve 90 so that this valve now opens. As valve 90 opens, the prepressurization gas is delivered from the cylinders 88 to the opening 64 of the mold and thereby to the mold cavity. Valve 90 remains open until such time as valve 112 opens, as explained below, after the injection of the shot of material is complete.

Also, when the mold closes, additional contacts 92 close, starting a timer 94. Timer 94 controls the operation of the accumulator and delays the injection of the shot of material long enough to allow the prepressurization of the mold. In addition, at the same time, a signal is sent on a line 98 to the nozzle control valve 50 causing the rod 46 of the nozzle to move and open the manifold passageway 42. In addition, a signal is sent on a line 100 to the accumulator 34, causing the accumulator piston to force the shot of material toward the nozzle assembly 44. The nozzle rod automatically closes the nozzle when the accumulator is empty. This nozzle control is accomplished in a conventional manner in response to signals from limit switches on the accumulator. A pressure gauge 102 monitors the pressure at opening 64 and thus the pressure within the mold. In addition, a pressure relief valve 104 positioned at the opening to mold 64 is set at a pressure approximately 10 psig higher than the pressure established by regulator 82. Consequently, as the material is injected into the mold, and the pressure within the mold cavity rises, a portion of the prepressurization gas is vented through the valve 104. Although the valve 104 relieves the pressure within the mold cavity during injection, it is still maintained at a level which substantially prevents diffusion of the blowing gas from the foaming agent.

A second timer 106 is also provided in the system. This timer commences timing when the nozzle or nozzles open and times out at approximately 0 to 1 second following the completion of the injection step. At this time, a signal on line 96 to valve 90 causes this valve to close and shut off the supply of prepressurization gas. In addition, a signal on line 110 opens a valve 112, coupling the mold venting opening 64 through this valve to a vacuum chamber 14. The vacuum draws the remainder of the prepressurization gas from the mold cavity and also draws the plastic material throughout the mold cavity.

Thereafter, the molded article is cured or solidified in a conventional manner and ejected from the mold. The system is then returned to its initial condition, and the cycle is repeated to form the next article.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. A method of molding foamed articles by injecting a molten synthetic resin material with a foaming agent contained therein from an injection means, including one or more nozzle means, into a cavity of a mold means, the method comprising the steps of:

closing the mold means;

prepressurizing the mold cavity with gas so as to substantially prevent diffusion of the blowing gas produced from the foaming agent;

injecting an amount of molten synthetic resin material containing a foaming agent into the cavity, the amount being insufficient to fill the cavity;

venting a portion of the prepressurization gas from the mold cavity through a discharge port during the injection step while maintaining the pressure within the mold cavity at a level which substantially prevents diffusion of the blowing gas produced from the foaming agent;

venting the remaining prepressurization gas and blowing gas from the mold cavity to a vacuum chamber means following the completion of the injection step so as to allow expansion of the injected foamable resin material within the mold cavity, the vacuum drawing the resin material throughout the mold cavity;

solidifying the molded article; and ejecting the article from the mold means.

2. A method according to claim 1 in which the step of venting the remaining prepressurization gas comprises the step of coupling the mold cavity to the vacuum means through plural spaced passageways so that the vacuum is drawn from the mold cavity of plural locations.

3. A method according to claim 1 in which the step of venting the remaining prepressurization gas comprises the step of venting such remaining gas at a predetermined time following the closing of the nozzle means.

4. A method according to claim 1 in which the step of injecting an amount of molten synthetic material comprises the step of injecting such material at a predetermined time following the closing of the mold means and following the commencement of the prepressurization step so as to facilitate the prepressurization of the mold cavity prior to the injecting step.

5. A method of molding foamed articles by injecting a molten synthetic resin material with a foaming agent contained therein from an injection means, including one or more nozzle means, into a cavity of a mold means, the method comprising the steps of:

closing the mold means;

prepressurizing the mold cavity through a port with gas so as to substantially prevent diffusion of the blowing gas produced from the foaming agent;

injecting an amount of molten synthetic resin material containing a foaming agent into the cavity, the amount being insufficient to fill the cavity;

venting a portion of the prepressurization gas from the mold cavity through the port during the injection step while maintaining the pressure at the port at a level which substantially prevents diffusion of the blowing gas produced from the foaming agent such that diffusion of the blowing gas is inhibited as this portion of the prepressurization gas is vented and the mold cavity is being filled with the molten resin material;

drawing a vacuum at the port following the completion of the injection step so as to vent the remaining prepressurization gas and blowing gas from the mold cavity and allow expansion of the injected foamable resin material within the mold cavity, the vacuum drawing the resin material throughout the mold cavity;

solidifying the molded article; and ejecting the article from the mold means.

6. A mold for forming structural foamed articles comprising:

a mold assembly including a fixed mold portion and a movable mold portion, said fixed and movable mold portions having respective first and second surfaces with side margins which abut when the mold is closed, the first and second surfaces having central portions which define a mold cavity therebetween;

gas flow means for delivering gas to and venting gas from the mold cavity, said gas flow means comprising an annular groove formed in the side margin of the first surface and surrounding the central portion of the first surface, plural gas flow channels formed in the side margin of the first surface and communicating between the mold cavity defining central portion of the first surface and the annular groove, said fixed mold portion being provided with a single external gas supply and gas venting opening and defining an internal gas passageway communicating between plural locations of the groove and the gas supply and venting opening such that a change in pressure at the opening is substantially immediately communicated to various spaced locations of the mold cavity; and sealing means for sealing the space between the first and second surfaces at a location which is preipheral of the groove; and vacuum means for selectively applying a vacuum to the venting opening.

7. A mold according to claim 6 in which said sealing means comprises a sealing trough formed in one of said first or second surfaces and surrounding the groove, a pair of annular sealing channels formed in the other of said first or second surfaces and separated by a rib portion of the other surface, said rib portion being positioned to overlie the sealing trough, a resilient seal positioned within the trough and projecting above the surface in which the trough is formed, the rib portion bearing against and compressing the seal when the mold is closed to thereby seal the space between the first and second surfaces.

8. A mold according to claim 6 in which said fixed mold portion defines plural transverse ejector pin receiving bores communicating between the mold defining central portion of the first surface and a third surface of the fixed mold portion which is spaced from the first surface;

ejector pin means each slidably received within an associated ejector pin bore;

seal means recessed into the third surface with each seal means surrounding a respective ejector pin means;

seal retainer cap means mounted to the third mold surface, said retainer cap having an ejector pin opening registering with an associated ejector pin bore so as to permit sliding movement of the associated ejector pin means through the ejector pin opening and within the associated ejector pin bore; and means for selectively sliding the ejector pin means within the ejector pin bores to first positions above the first surface to eject molded articles from the mold and to second position flush with the first surface during molding of articles within the mold.

9. A mold according to claim 6 in which said vacuum means comprises means for applying a vacuum a predetermined time after the closing of the mold.

* * * * *